United States Patent
Bujak, Jr.

(10) Patent No.: US 6,644,398 B2
(45) Date of Patent: Nov. 11, 2003

(54) ADVANCED STARTING CONTROL FOR MULTIPLE ZONE SYSTEM

(75) Inventor: Walter E. Bujak, Jr., Suffield, CT (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 10/211,880

(22) Filed: Aug. 5, 2002

(65) Prior Publication Data

US 2002/0185272 A1 Dec. 12, 2002

Related U.S. Application Data

(62) Division of application No. 09/572,901, filed on May 17, 2000, now Pat. No. 6,467,537.

(51) Int. Cl.[7] .............................................. F28F 27/00
(52) U.S. Cl. .................. 165/209; 165/208; 165/220; 165/239; 62/132; 237/2 R; 237/8 A; 237/12; 700/8
(58) Field of Search ................................ 165/200, 205, 165/208, 209, 218, 219, 220, 221, 238, 239; 237/2 R, 2 B, 8 A, 12; 62/132, 115, 176.6, 196.1, 197, 56, 158, 173, 175; 364/148; 700/8, 17

(56) References Cited

U.S. PATENT DOCUMENTS

| | | | | |
|---|---|---|---|---|
| 3,252,504 A | * | 5/1966 | Newton | 165/208 |
| 3,384,155 A | * | 5/1968 | Newton | 165/208 |
| 4,192,455 A | * | 3/1980 | Rasmussen et al. | 165/208 X |
| 4,487,028 A | * | 12/1984 | Foye | 62/173 X |
| 4,729,424 A | * | 3/1988 | Mizuno et al. | 62/175 X |
| 5,207,070 A | * | 5/1993 | Miyazaki | |
| 5,245,835 A | * | 9/1993 | Cohen et al. | |
| 5,303,767 A | * | 4/1994 | Riley | |
| 5,467,604 A | * | 11/1995 | Sekigami et al. | 62/175 X |
| 5,501,265 A | * | 3/1996 | Bujak, Jr. | |
| 5,602,758 A | * | 2/1997 | Lincoln et al. | 165/205 X |
| 5,769,314 A | * | 6/1998 | Drees et al. | 62/175 X |
| 5,875,109 A | * | 2/1999 | Federspiel | 364/148 |
| 5,927,398 A | * | 7/1999 | Maciulewicz | 165/208 X |
| 5,974,813 A | * | 11/1999 | Jeong | 62/175 X |
| 6,081,750 A | * | 6/2000 | Hoffberg et al. | 700/17 |
| 6,240,324 B1 | * | 5/2001 | Preska et al. | 700/8 |
| 6,298,677 B1 | * | 10/2001 | Bujak, Jr. | 62/158 |

FOREIGN PATENT DOCUMENTS

EP          1 113 231 A2 *  7/2001

* cited by examiner

Primary Examiner—Ljiljana Ciric
(74) Attorney, Agent, or Firm—William F. White

(57) ABSTRACT

A system and method for controlling delivery of conditioned water to a plurality of heat exchangers includes a system controller which gathers information as to the current and future demands for conditioned water by a plurality of zone controllers associated with the plurality of heat exchangers. The system controller is operative to provide conditioned water to the heat exchangers even though current demands for conditioned water may not be sufficient to require the provision of conditioned water to the heat exchangers. The system controller analyzes current demands for conditioned water in combination with future demands for conditioned water to determine if the combined demands exceed a minimum level or number of demands necessary to authorize provision of conditioned water to the heat exchanger. A start time for the provision of the conditioned water is thereafter determined by the system controller in the event that any combination of current and future demands for conditioned water exceeds the minimum level or number of demands necessary to authorize a provision of conditioned water.

9 Claims, 14 Drawing Sheets

| ZONE "$Z_i$" | HEAT DEMAND $H\_D_i$ | CURRENT ZONE TEMP. "$T_i$" | FUTURE SETPOINT "$S_i$" | SCHEDULED SETPOINT START TIME "$t_i$" | ZONE HEAT FACTOR "$H_i$" | TIME REQUIRED TO ACHIEVE HEAT SETPOINT $\Delta t_{hi}$ | HEAT START TIME $t_{hi}$ |
|---|---|---|---|---|---|---|---|
| $Z_1$ | $H\_D_1$ | $T_1$ | $S_1$ | $t_1$ | $H_1$ | $\Delta t_{h1}$ | $t_{h1}$ |
| $Z_2$ | $H\_D_2$ | $T_2$ | $S_2$ | $t_2$ | $H_2$ | $\Delta t_{h2}$ | $t_{h2}$ |
| ⋯ | ⋯ | ⋯ | ⋯ | ⋯ | ⋯ | ⋯ | ⋯ |
| $Z_n$ | $H\_D_n$ | $T_n$ | $S_n$ | $t_n$ | $H_n$ | $\Delta t_{hn}$ | $t_{hn}$ |

FIG.3

| ZONE "$Z_i$" | COOL DEMAND $C\_D_i$ | CURRENT ZONE TEMP. "$T_i$" | FUTURE SETPOINT "$S_i$" | SCHEDULED SETPOINT START TIME "$t_i$" | ZONE COOLING FACTOR "$C_i$" | TIME REQUIRED TO ACHIEVE COOL SETPOINT $\Delta t_{ci}$ | COOL START TIME $t_{ci}$ |
|---|---|---|---|---|---|---|---|
| $Z_1$ | $C\_D_1$ | $T_1$ | $S_1$ | $t_1$ | $H_1$ | $\Delta t_{c1}$ | $t_{c1}$ |
| $Z_2$ | $C\_D_2$ | $T_2$ | $S_2$ | $t_2$ | $H_2$ | $\Delta t_{c2}$ | $t_{c2}$ |
| ⋮ | ⋮ | ⋮ | ⋮ | ⋮ | ⋮ | ⋮ | ⋮ |
| $Z_n$ | $C\_D_n$ | $T_n$ | $S_n$ | $t_n$ | $H_n$ | $\Delta t_{cn}$ | $t_{cn}$ |

*FIG.8*

ADVANCED STARTING CONTROL FOR MULTIPLE ZONE SYSTEM

This application is a division, of application Ser. No. 09/572/901 filed May 17, 2000, now U.S. Pat. No. 6,467,537, which issued on Oct. 22, 2002.

BACKGROUND OF THE INVENTION

This invention relates to systems which employ water as a heat exchange medium so as to add heat to various parts of a building that are to be heated or to systems that employ water as a heat exchange medium to remove heat from various parts of a building to be cooled.

It is desirable that a system for heating various parts of a building be capable of responding to different demands for heating throughout the building at any time of the day or night. It is moreover desirable that such a system be capable of responding to reduced demands for heating during evening or nighttime hours when various parts of the building may not be occupied. It is also desirable that these same parts of the building be brought up to comfortable temperature levels during occupancy.

It is desirable that a system for cooling various parts of a building be capable of responding to different demands for cooling throughout the building at any time of the day or night. It is moreover desirable that such a system be capable of responding to reduced demands for cooling during evening or nighttime hours when various parts of the building may not be occupied. It is also desirable that these same parts of the building be brought down to comfortable temperature levels during occupancy.

This need to meet comfort levels during occupancy by either a heating system or a cooling system can present particular problems when water is used as the preferred heat exchange medium. In this regard, water in such a system usually needs to itself be first conditioned by appropriate equipment and thereafter circulated in advance of occupancy in order to meet the desired comfort levels during occupancy.

It is an object of the invention to provide a control for a system employing water as a heat exchange media which will accurately anticipate the needs of various parts of a building in advance of occupancy or at any other time of the day or night.

SUMMARY OF THE INVENTION

The present invention includes a controller for a system providing conditioned water to preferably a number of individual heat exchangers. The controller gathers information from local dedicated controllers associated with each of the heat exchangers. The gathered information includes information as to the current demand for conditioned water by each such heat exchanger as well information concerning the future demand for conditioned water.

The controller preferably creates an array of the thus received information by zone. The controller furthermore uses the received information that has been organized by zone to compute several additional pieces of information for each particular zone that is preferably stored in additional fields within the array. The additional pieces of information may include a start time for providing conditioned water to a particular zone.

The controller preferably first computes the percentage of dedicated local controllers currently having demands for conditioned water. The controller inquires as to whether the particularly computed percentage of dedicated local controllers is greater than a minimum demand requirement for conditioned water.

In the event that the particularly computed percentage of dedicated controllers is not greater than the respective minimum demand requirement for conditioned water, then the processor will proceed to an advance start routine. The advance start routine will determine whether or not there are anticipated demands in the future that might be combined with current demands so as to produce a future requirement for conditioned water that would be greater than the respective minimum requirement for conditioned water. The controller will proceed to determine the earliest start time that would produce a requirement for conditioned water that just exceeds the respective minimum requirement for conditioned water when anticipated demands in the future combined with current demands produce a future requirement for conditioned water that would be greater than the minimum requirement for conditioned water.

Following determination of the earliest start time, the system controller will set a system demand equal to heating if the system being controlled is a heating system. The system controller will set the system demand equal to cooling if the system being controlled is a cooling system.

The system will next check to see what the current mode of operation is before activating the heating system or the cooling system being controlled. If the current mode of operation is "none", then the system controller will proceed to actually authorize the start up of the particular system being controlled.

BRIEF DESCRIPTION OF THE DRAWINGS

For a fuller understanding of the present invention, reference should now be made to the following detailed description thereof taken in conjunction with the accompanying drawings wherein:

FIG. 3 is an array of information formed during execution of the logic within the flow chart of FIGS. 2A–2B;

FIG. 8 is an array of information formed during execution of the logic within the flow chart of FIGS. 7A–7B;

DESCRIPTION OF THE PREFERRED EMBODIMENTS

Figure 1:
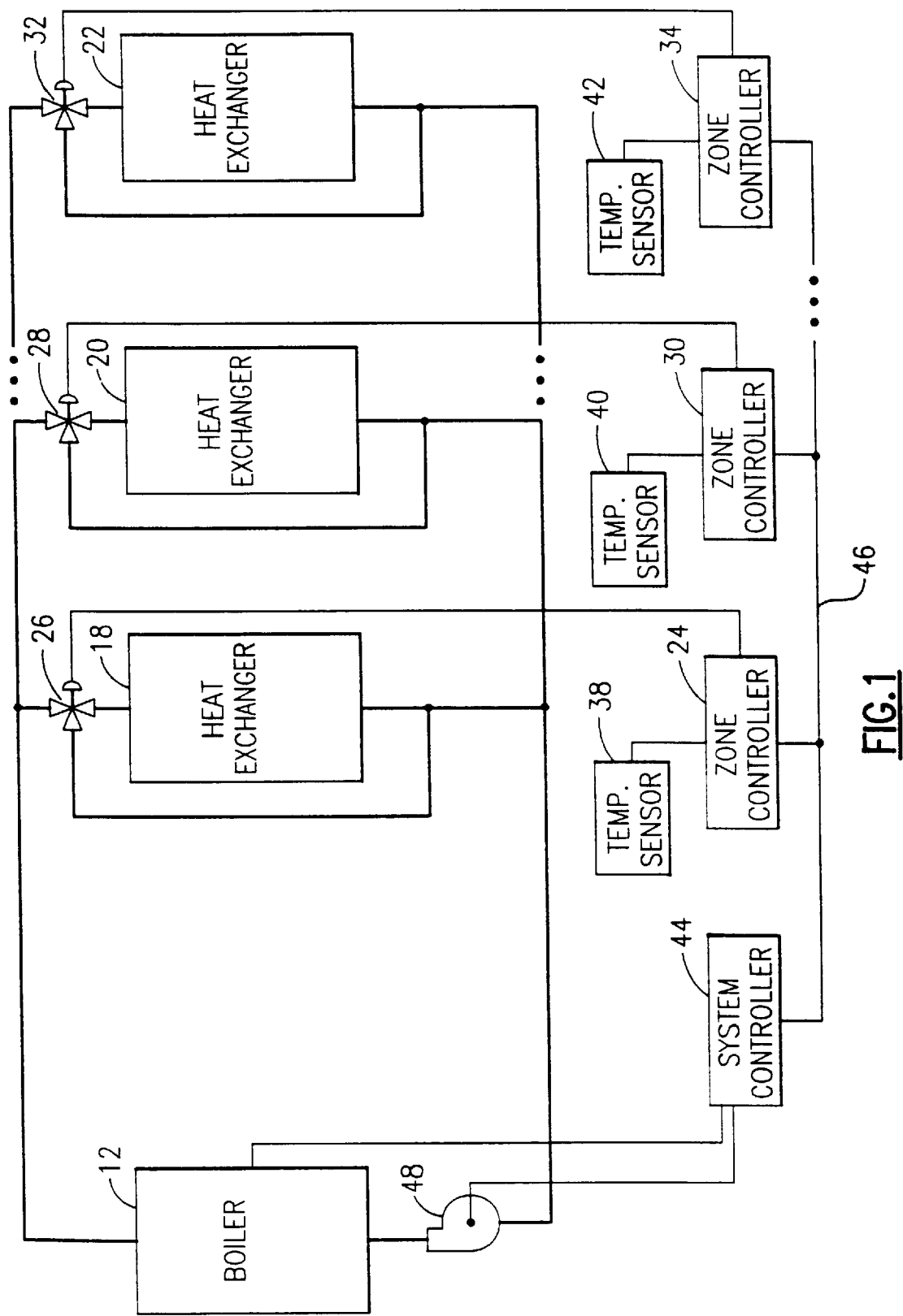
FIG. 1 is a schematic view of a system for delivering heated water to a series of heat exchangers having zone controllers associated therewith.

Referring now to FIG. 1, a heating system is seen to include a boiler 12. Hot water from the boiler 12 flows to heat exchangers 18, 20 and 22. It is to be understood that each heat exchanger may use the delivered water to condition air in a space that is to be heated. This is often referred to as a "zone of heating". Water from the boiler 12 flows through the heat exchanger 18 in the event that a zone controller 24 authorizes such a flow by the positioning of a control valve 26. The zone controller 24 may also divert any water flow around the heat exchanger 18 by a further positioning of the control valve 26. It is to be appreciated that the heat exchanger 20 operates in a similar fashion in response to the positioning of a control valve 28 under the control of a zone controller 30. It is furthermore to be appreciated that the last heat exchanger 22 in the system will also be controlled by the positioning of a control valve 32 under the control of a zone controller 34. Water flow to each heat exchanger within each corresponding zone can either fully bypass the heat exchanger, fully flow through the heat exchanger, or partially flow through the heat exchanger and bypass. The control valve position is determined by the zone controller and is a function of the zone's heating requirement and the type of valve used. Each zone controller 24, 30 and 34 is also connected to a corresponding temperature sensor such as 38, 40 and 42, which senses the temperature in the respective zone serviced by the heat exchanger and provides such temperature information to the respective zone controller. Each zone controller will furthermore have a stored setpoint value for the particular zone. This may be a temperature that is arbitrarily defined by an individual either through a programmable thermostat or other device suitable for entering setpoint information. Each zone controller will either have a demand for heat or not, depending on the sensed temperature in the zone versus the zone's currently active setpoint. Each zone controller will also preferably include information concerning future setpoints. This information will include setpoint values in whatever degree temperature system being used and the times these setpoints are to take effect.

Information concerning each individual zone controller is provided to a system controller 44 via a bus 46. The system controller 44 controls a pump 48 so as to thereby pump return water from the heat exchangers 18, 20 and 22 into the boiler 12.

Figure 2A:
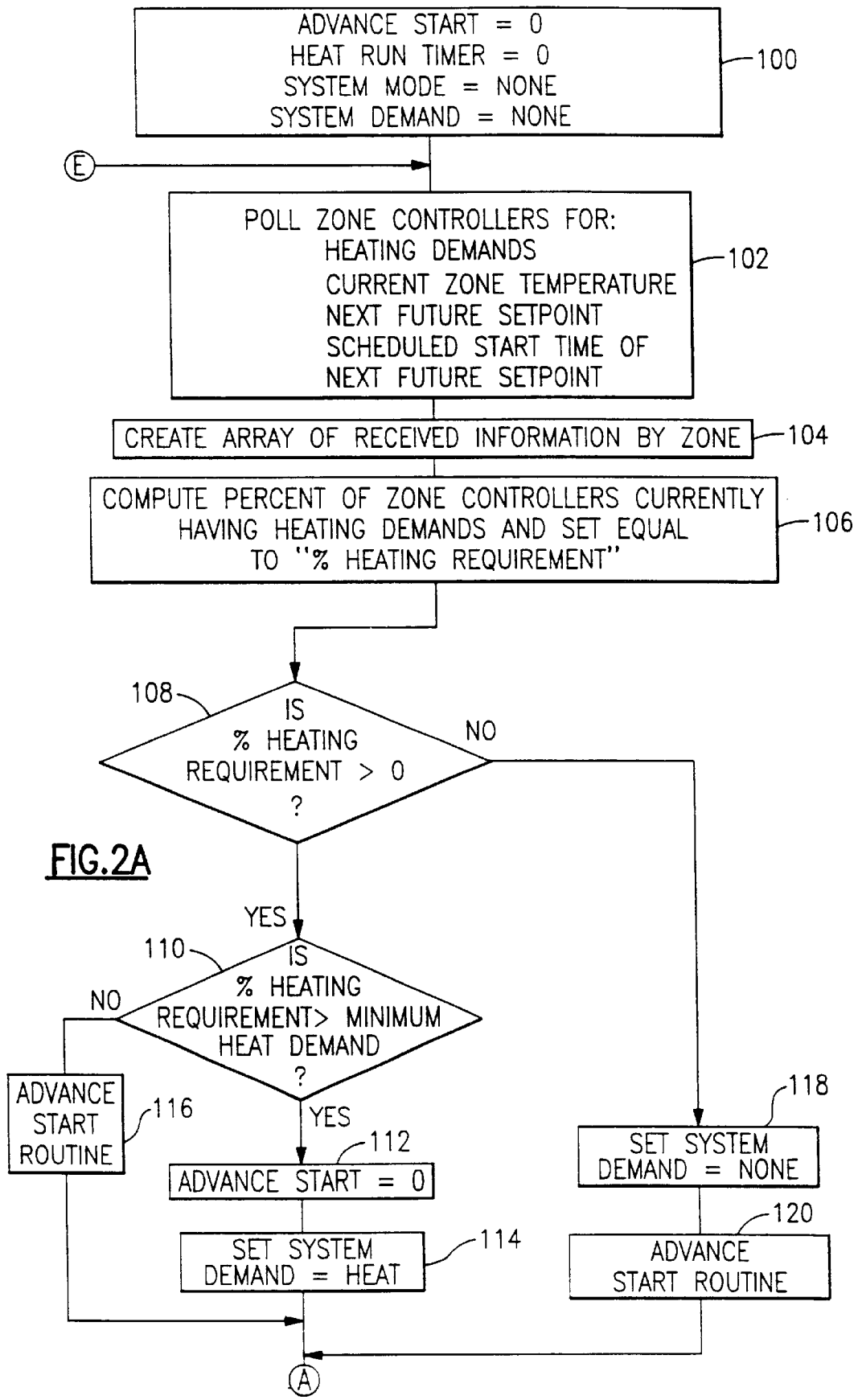
FIGS. 2A–2B are a flow chart of the method used by a system controller in communication with the zone controllers within FIG. 1 to control the activation or deactivation of a boiler within the system of FIG. 1.
Figure 2B:
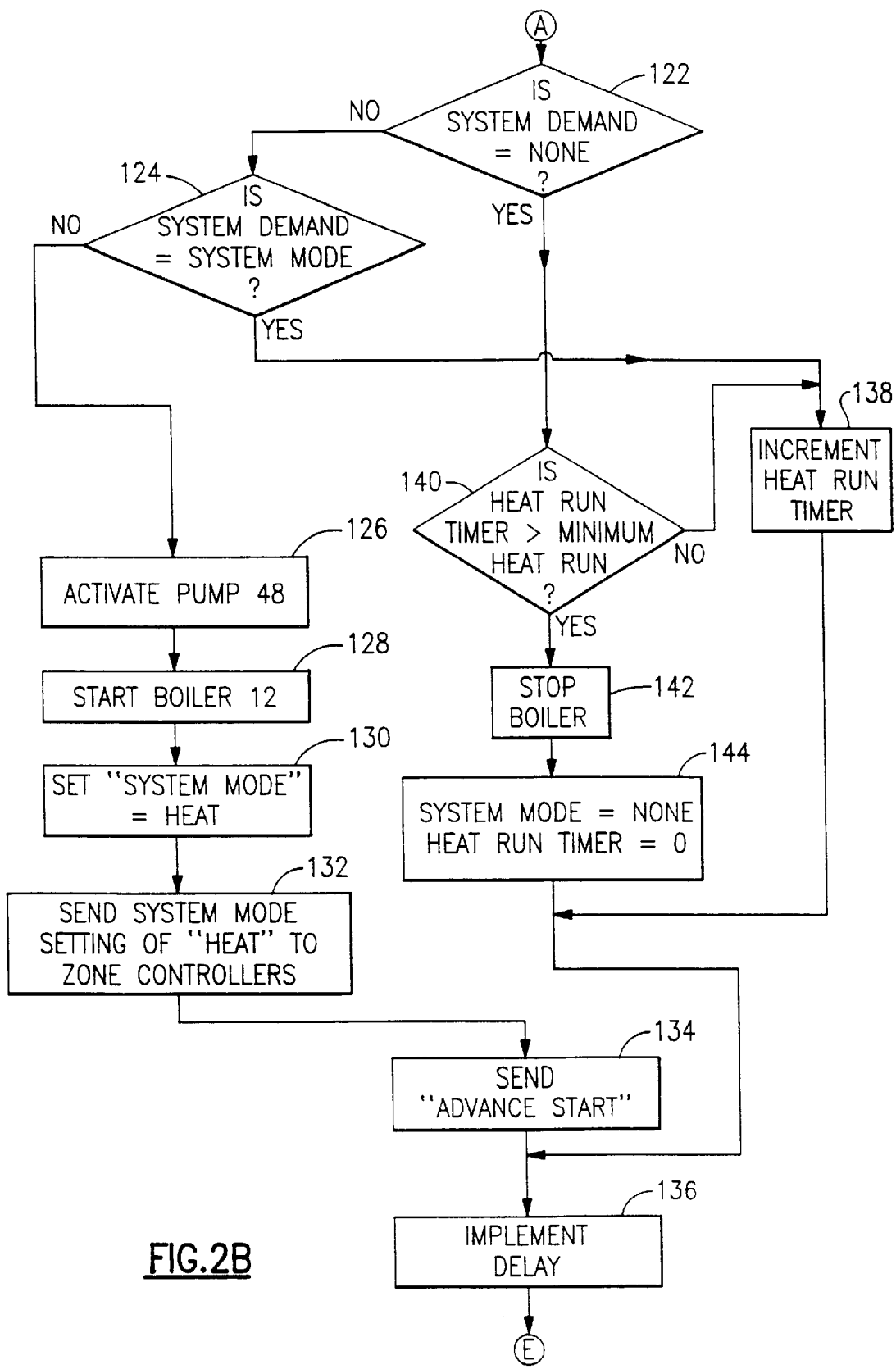

Referring now to FIGS. 2A and 2B, a process utilized by a programmable microprocessor within the system controller 44 is illustrated. The process begins with an initialization step 100, which sets the initial values of the following variables: "advance start", "heat run timer", "system demand" and "system mode". The microprocessor within the system controller 44 will proceed to a step 102 and poll each of the zone controllers for their respective current demands for heating, current zone temperature, next future setpoint, and associated start time for the next future setpoint. It is to be appreciated that this is preferably done by addressing each zone controller 24, 30 and 34 via the bus 46 and requesting the specific information from the zone controller. The zone information is preferably stored in a memory associated with the microprocessor within the system controller.

The microprocessor proceeds to a step 104 and creates an array of received information by zone. The array of information preferably includes the received information of step 102 organized as shown in FIG. 3. Referring to FIG. 3, it is to be noted that the array of information includes respective current demands for heating, current zone temperature, next future setpoint, and associated start time for the next future setpoint. The array also includes additional information for each zone that is not gathered as a result of polling the zone controllers in step 102. This includes a zone heat factor $H_i$. The zone heat factors for each respective zone are preferably already stored in memory. Alternatively, these factors could be directly read from the zone controllers themselves. The zone heat factors are preferably constants defining the amount of time required to raise the temperature in the zone by one degree with respect to the temperature system being used to define temperature information, In addition to the aforementioned zone heat factors, the array also includes two parameters that are computed for each zone using the zone heat factor for the zone. These parameters are time required to achieve heat set point $\Delta t_{hi}$, and heat start time $t_{hi}$.

Figure 4:
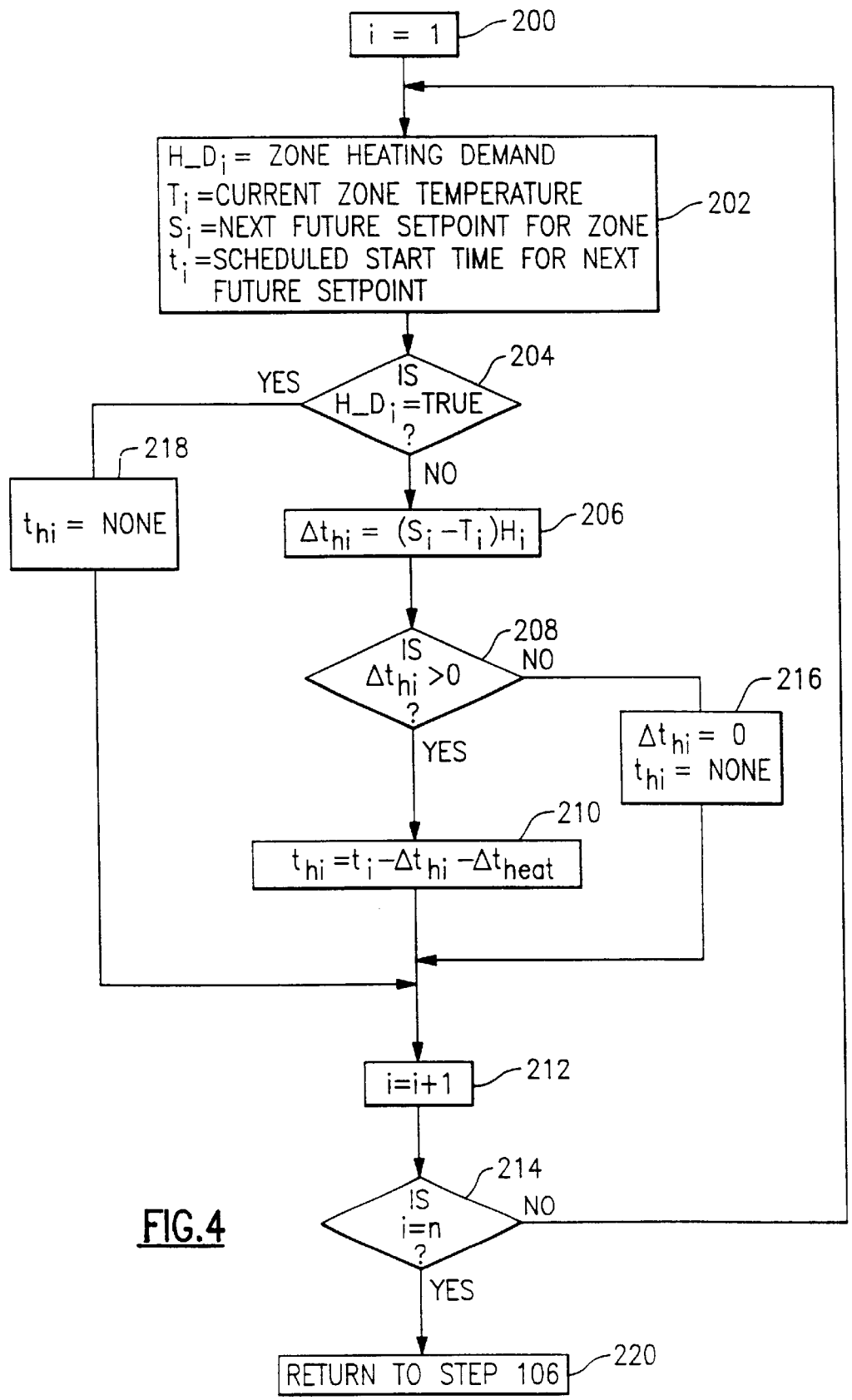
FIG. 4 is a flow chart of a routine used to produce the array of information of FIG. 3.

The array of FIG. 3 including the computed parameters may be formed by an array routine such as is disclosed in FIG. 4. The array routine begins in a step 200 wherein a zone index "i" is set equal to one. The microprocessor proceeds to a step 202 and sets the zone heating demand for the first addressed zone controller in step 102 equal to $H\_D_1$. It is to be noted that if there is no zone heating demand, then the value of zone heating demand will be zero so that $H\_D_1$ would be zero. If there is a zone heating demand, then the $H\_D_1$ would be set equal to TRUE. The current zone temperature for the first addressed zone controller will be stored as $T_1$ in the array of FIG. 3 whereas the next future set point for the first addressed zone will be stored as $S_1$. The scheduled start time for the next future setpoint of the first addressed zone controller will be stored in $t_1$ within the array of FIG. 3. If there is no future setpoint and associated start time, then the present setpoint and present time are stored as $S_1$ and $t_1$ respectively.

The microprocessor will proceed from step 202 to a step 204 and inquire as to whether the zone heating demand $H\_D_1$ is equal to TRUE. Assuming that there is not a present zone heating demand for the first addressed zone controller, then the microprocessor will proceed along the "no" path from step 204 to a step 206 and compute the time required to achieve heat set point for this particular zone. Referring to step 206, the time required to achieve heat set point, $\Delta t_{hi}$ is equal to the difference between the future setpoint $S_i$ and the current zone temperature $T_i$ multiplied times the heating factor $H_i$ for the particular zone. The microprocessor proceeds to a step 208 and inquires whether the computed time required to achieve heat setpoint in step 206 is greater than zero. In the event that the value of $\Delta t_{hi}$ is greater than zero, then the microprocessor will proceed to a step 210 and compute the heat start time for the particular zone. Referring to step 210, the heat start time, $t_{hi}$ is equal to the next future setpoint start time, $t_1$, minus the computed time required to achieve heat set point $\Delta t_{hi}$ which has been computed for the particular zone minus a further differential temperature $\Delta t_{heat}$. The value of $\Delta t_{heat}$ is a predefined value stored in the memory associated with the microprocessor that is typically required to heat the water to a desired temperature for operating the system of FIG. 1 in the heating mode. This value is preferably determined for each heating system on the basis of what the likely temperature is to be after several hours of the boiler being off. The value could be determined on a conservative basis of the water being at or near the worst possible temperature that could exist in the water loop before the zone controllers would begin to demand heat.

The microprocessor proceeds from step 210 to step 212 and increments the zone index "i" by one. The processor will next inquire as to whether the incremented zone index "i" is equal to "n" in a step 214. The value of "n" is the total number of zone controllers in the system of FIG. 1. Assuming that the zone index "i" is not equal to "n", then the processor will proceed back to step 202 and address the information selected in step 102 for the second read zone controller. The microprocessor will proceed to step 204 and inquire as to whether the zone heating demand read from the second addressed zone controller is equal to TRUE. Assuming that there is no present heat demand for the second read zone controller, then the processor will proceed to compute the time $\Delta t_{h2}$ required to achieve heat setpoint $S_2$ in step 206. Assuming that the future setpoint for the second read zone controller is less than the current zone temperature $T_2$, then the value of $\Delta t_{h2}$ will be less than zero. This will prompt the processor to proceed along "no" path out of step 208 to a step 216 and set the value of $\Delta t_{h2}$ equal to zero and the value of the heat start time $t_{h2}$ equal to none.

The processor will proceed from step 216 to step 212 and increment the zone index "i" by one. The processor will next inquire as to whether the incremented zone index "i" is equal to "n" in a step 214. Assuming again that the zone index "i" has not incremented to the last zone, the processor will proceed from step 214 along the "no" path back to step 202 following the setting of the variables in 202 equal to the respective read values for the next zone that has been previously read. The microprocessor will proceed from step 202 to step 204 and inquire as to whether the zone heating demand for this particular zone is equal to true. Assuming that the particular addressed zone controller does have a heating demand, then the processor will proceed along the "yes" path to a step 218 and set the heat start time $t_{hi}$ for this particular zone equal to none. In other words, if the particular zone does have a present heating demand, then there will not be a heat start time for such a zone. The microprocessor will proceed to step 212 and increment the zone index "i" again by one. It is to be appreciated that at some point in time the zone index would have been incremented to the value of "n". At this point in time there will be appropriately recorded and computed values for all zones in the array of FIG. 3. The processor will proceed from step 214 to a step 220 and execute a return to step 106.

Referring to FIG. 2A, the microprocessor proceeds in step 106 to compute the percentage of zone controllers having heat demands H_$D_i$=TRUE. This is preferably done by first adding up the number of heating demands equal to true in the array of FIG. 3 and dividing this number by the total number, "n", of zone controllers present within the system of FIG. 1. The results are stored as "percent heating requirement".

The microprocessor proceeds to a step 108 and inquires whether the percent heating requirement computed in step 106 is greater than zero. In the event that the percent heating requirement is greater than zero, the microprocessor within the system controller 44 will proceed to step 110. Referring to step 110, the processor will inquire as to whether the percent heating requirement computed in step 106 is greater than a "minimum heat demand". The minimum heat demand is preferably a stored percentage value in the memory associated with the microprocessor. This percentage value should be slightly less than the percentage of zone controllers that must be demanding heat in the system of FIG. 1 in order for the system to provide heated water. When this percentage is exceeded, the microprocessor within the system controller will proceed in a step 112 to set "advance start" equal to zero before proceeding in a step 114 to set "system demand" equal to heat.

Figure 5A:
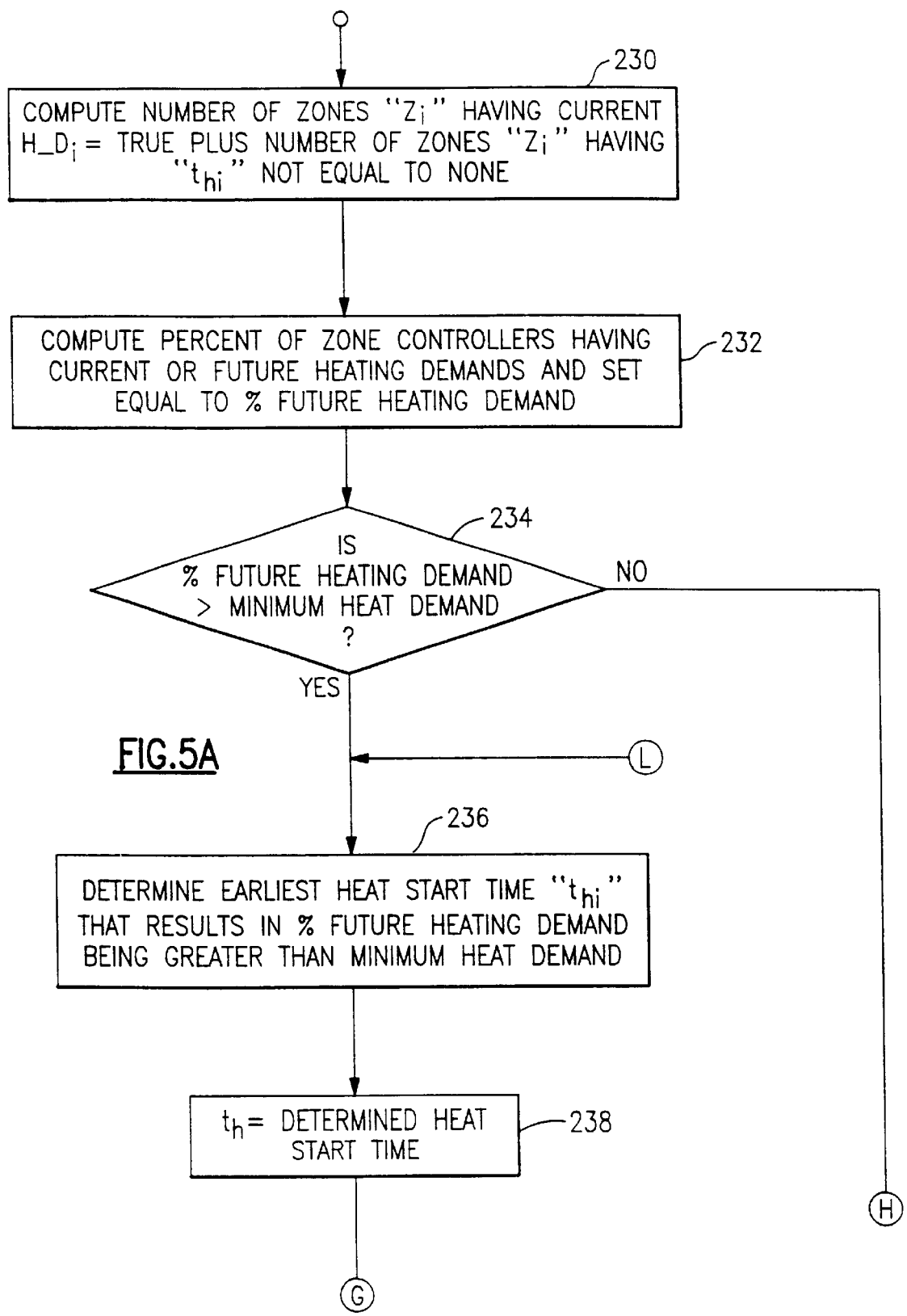
FIGS. 5A–5B are a flow chart of an advance start routine use within the flow chart of FIGS. 2A–2B.

Referring again to step 110, in the event that the percent heating requirement computed in step 106 is not greater than the minimum heat demand, then the processor will proceed along the "no" path to a step 116 and initiate an advance start routine. Referring to FIG. 5A, the advance start routine begins with a step 230. Referring to step 230, the number of zones having current heat demands H_$D_i$ equal to true plus the number of zones having a heat start time not equal to none is computed. It is to be appreciated that this computation is preferably accomplished by scanning the created array in FIG. 3 for the number of current heat demands H_$D_i$ equal to true and moreover the number of heat start times not equal to none. The microprocessor proceeds to step 232 and computes the percent of zone controllers having current or future heating demands. This is preferably the number of zone controllers having current or future heating demands computed in step 230 divided by the number "n" of zone controllers present within the system of FIG. 1. The computed fraction is expressed in terms of percent and set equal to percent future heating demand in step 232. The microprocessor proceeds to a step 234 to inquire whether the percent future heating demand computed in step 232 is greater than the minimum heat demand for the system of FIG. 1. In the event that the computed percent of future heating demand is greater than the minimum requirement, Depending on the number of additional zones needed, the processor will go through the array of FIG. 3 that number of times selecting the first to occur of the heat start times and then, if necessary, the next to occur heat start time until the number of zone heat start times have been gathered to meet the minimum number of zones necessary to exceed the minimum heat demand. When this occurs, the thus determined earliest heat time necessary to have the minimum number of zones exceed the minimum heat demand is set equal to "$t_h$" in step 238. The microprocessor proceeds to step 240 and reads the current time from the system clock for the controller. The current time is preferably defined in such a way so as to include more than just time of day so as to thereby account for transitions from one day to the next. This may be done by including day of the week in the system clock or by maintaining a tracking of time by minute for an entire week. Whatever is used, the start time $t_{hi}$ will be similarly maintained. The processor proceeds in step 242 to inquire as to whether the current time of the system clock is greater than the heat start time $t_h$ as defined in step 238. In the event that the read current system clock time is not greater than or equal to the heat start time, $t_h$, then the microprocessor will proceed along the "no" path to a step 244 and set "advance start" equal to zero before proceeding to an exit step 246. This will prompt the microprocessor to return to step 116 of the logic in FIG. 2A and proceed to whatever the next step is following step 116.

Referring again to step 242, in the event that the current time of the system clock is greater than or equal to heat start time, $t_h$, the processor will proceed to step 248 and set "system demand" equal to heat. This will essentially mean that the system of FIG. 1 is to be treated as having a sufficient number of heat demands to proceed into heating as will be discussed hereinafter. The processor will however make note that any such transition would be due to the advance start routine. This is accomplished by setting "advance start" equal to one in a step 250. The processor will proceed to exit step 246 and return to step 116 wherein it will proceed to the next step out of step 116.

Figure 5B:
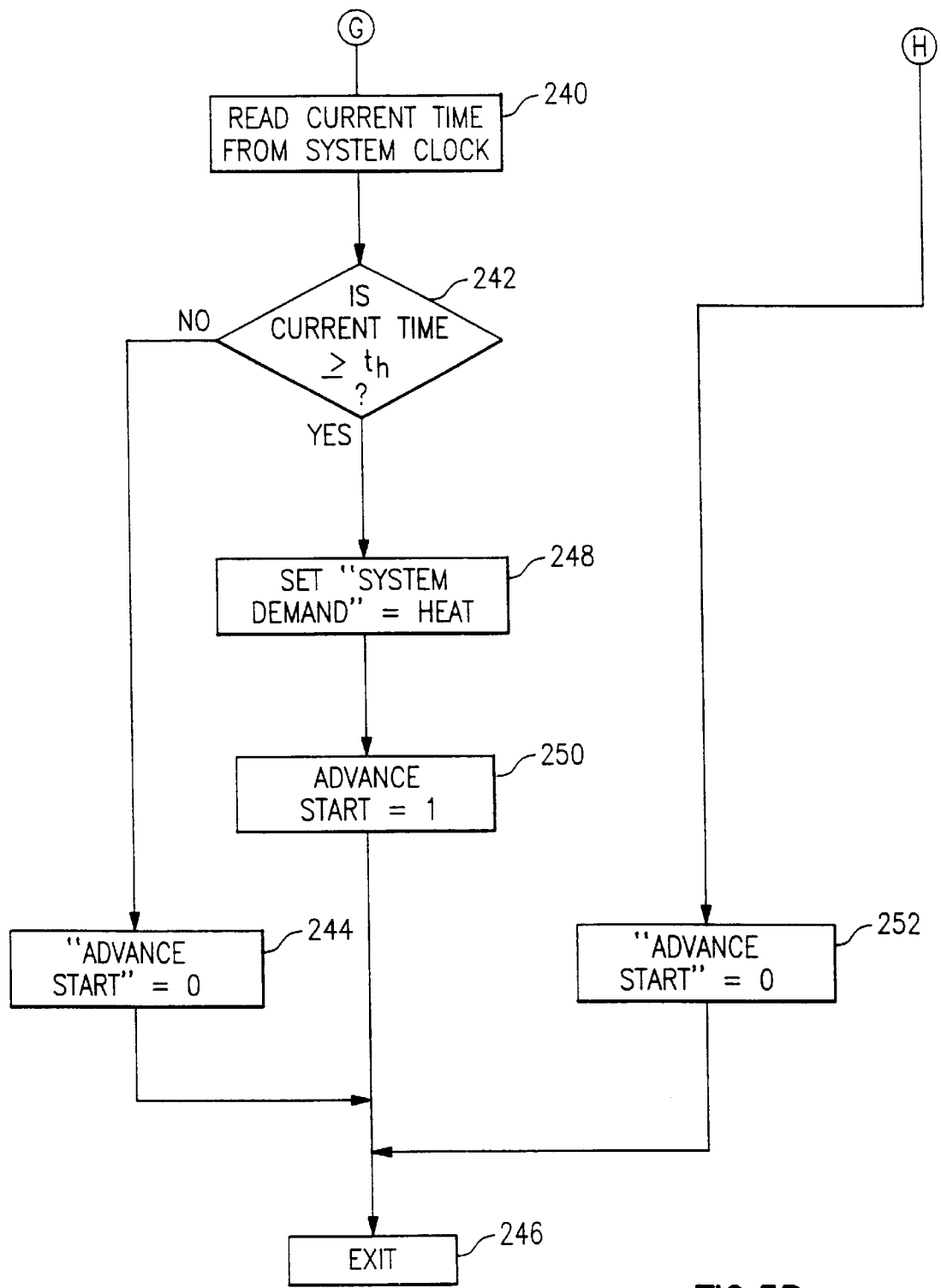

Referring again to step 108, in the event that the percent heating requirement is not greater than zero, the microprocessor will proceed along the "no" path to a step 118 and set system demand equal to none before proceeding to execute the advance start routine in step 120. Again, referring to the advance start routine of FIGS. 5A–5B, the microprocessor computes the number of zones having current heat demands $H\_D_i$ equal to true plus the number of zones having a heat start time not equal to none in step 230 and then proceeds to step 232 and computes the percent of zone controllers having current or future heating demands. The processor proceeds to step 234 to inquire whether the percent future heating demand computed in step 232 is greater than the minimum heat demand for the system of FIG. 1. Assuming the computed percent of future heating demand is less than the minimum requirement, the microprocessor proceeds along the "no" path to step 252. The processor will set advance start equal to zero in step 252 before proceeding to exit step 246 where the processor would return to step 120 and proceed to the next step.

Referring to step 122 in FIG. 2B, it is to be appreciated that the processor will have proceeded from either step 114, step 116, or step 120 to this step with a particular setting of system demand. For instance, if the "system demand" is "none" as a result of its initial setting in step 100, then it may continue to be so after exiting step 116 or step 120. If on the other hand, the "system demand" was previously set to heat in a prior execution of the logic, then that would remain the system demand until the logic executed step 118 to reset the system demand equal to None.

It is noted that the processor inquires as to whether the system demand equals none in step 122. Assuming the system demand is set to heat as a result of either step 114, step 116 or step 120, the processor will proceed along the no path out of step 122 to a step 124 and inquire as to whether the value of system demand equals the value of "system mode".

If the processor is operating immediately after initialization, the system mode value will be none even though system demand is equal to heat. This will prompt the processor to proceed along the no path to a step 126. Referring to step 126, the processor will activate pump 48 before proceeding to step 128 wherein the boiler 12 is activated. The processor proceeds to set "system mode" equal to heat in a step 130. The processor will proceed from step 130 to a step 132 and send the system mode setting of "heat' to the zone controllers 24, 30, and 34. The processor will also send the "advance start" setting to each zone controller in a step 134. Each zone controller will use the communicated settings of system mode and advance start to determine how to position its control valve. In this regard, if the local demand is for heating, then the control valve will be positioned by the zone controller so as to deliver hot water from the boiler to the heat exchanger. If the local demand does not require heating, then the hot water from the boiler will bypass the heat exchanger. If the local controller receives an advance start setting of one, then it will inquire as to whether the next future setpoint is greater than the current zone temperature. If the answer is yes, then the local zone controller will position its control valve as though heating is presently being required. It is to be appreciated that the above assumes that the local zone controller is not able to independently determine whether the water being delivered is hot. In the event that the zone controllers possess the capability of independently determining the temperature of the water being delivered, then they will implement the positioning of their respective control valves without the need to receive the system mode setting from the system controller 44.

The processor will proceed from step 134 to a step 136 wherein a predefined time delay will be implemented before returning to step 102. It is to be appreciated that the amount of time delay will be an arbitrary timed amount for a given system so as to delay the system controller before it again polls the zone controllers in step 102.

Referring again to steps 102–104, the processor within the system controller will poll the zone controllers and thereafter create the array of FIG. 3 before computing the percentages of zone controllers having heat demands. The processor will again determine whether or not the percentage heating requirement is greater than zero in a step 108. Assuming that the zone controllers continue to have essentially the same current heating demands, then the percent heating requirement will continue to exceed zero. This will prompt the processor to again inquire as to whether the minimum heat demand has been exceeded in step 110. The processor will set either the system demand equal to heat in step 114 or it will proceed to execute the advance start routine in step 116. This routine will set system demand equal to heat if future heating demands require such and the system clock time is greater than the determined start time for meeting the future heating demands. The processor will proceed to step 122 and again inquire as to whether the system demand is equal to none. Since the system demand will be equal to heat, the processor will proceed to step 124 and inquire as to whether system demand equals system mode. Since system mode will now be equal to heat, the processor will proceed along the yes path to a step 138 and increment a "heat run timer". The heat run timer will be incremented for the first time since the heat run timer was initially set equal to zero. It is to be appreciated that the amount by which the heat timer will be incremented will preferably be the same as the amount of delay set forth in step 136 between successive executions of the control logic. The processor will proceed from step 138 to step 136 wherein the delay will be again implemented before returning to step 102. It is to be appreciated that the processor will continue to execute the logic as previously described when either the current demands for heat exceed minimum heat demand or when the advance start routine calls for setting the system demand equal to heat. It will be remembered that the advance start routine will set system demand equal to heat when current and future heating demands exceed minimum heat demand and the system clock time exceeds determined heat start time.

Assuming that at setpoint all heating demands are met, then the percentage heating requirement will no longer exceed zero in step 108. When this occurs, system demand will be set equal to none in step 118. If the future heating demand in step 234 of the advance start routine implemented in step 120 does not exceed the minimum heat demand, then the system demand will remain set equal to none.

Since system demand will now be equal to none, the processor will proceed along the "yes" path out of step 122 to step 140 and inquire as to whether the heat run timer is greater than minimum heat run. It will be remembered that the heat run timer will have been successively incremented in step 138 each time the processor within the system controller executes the control logic of FIGS. 2A and 2B. Assuming that the system of FIG. 1 has been in a heating mode of operation for a considerable period of time, the heat run timer will normally exceed any minimum amount of time established for a heat run of the system of FIG. 1. It is to be appreciated that minimum heat run time will be stored in memory for use by the processor within the system controller. Assuming that the heat run timer has exceeded this minimum heat run time, the processor will proceed to a step 142 and stop the operation of the boiler 12. It is to be appreciated that this may be a signal from the system controller to the burner control within the boiler 12. The processor will proceed from step 142 to a step 144 and set system mode equal to none and the heat run timer equal to zero. The processor will then proceed from step 144 to step 136 and again implement the prescribed amount of delay before the next execution of the control logic.

It is to be appreciated that the processor will continue to poll the zone controllers and take whatever appropriate action is necessary based on current heating demands or current and future heating demands as has been previously discussed. At some point the various zones being provided with heat may become unoccupied and the current setpoint temperature may be set relatively low so as to conserve energy. If this occurs, then the zone controllers may not be generating any current heating demands to the system controller. The processor in this situation will note that the percent heating requirement is zero in step 108. The processor will proceed to set system demand equal to none in step 118 before implementing the advance start routine in step 120. Referring to step 230 of the advance start routine, the processor will compute the number of zones having current heat demand equal to true plus the number of zones having heat start times not equal to none. Since the zones will have no current heat demands, then the array of information in FIG. 3 should essentially have future heat start times, $t_{hi}$. This should prompt the processor to compute a percent future heating demand that is based on future heat start times. The percent future heating demand will normally exceed minimum heat demand in step 234, if the building is to become occupied at some point. The processor will proceed along the "yes" path to step 236 and determine the earliest heat start time, $t_{hi}$, that will produce the first percent future heating demand that is greater than the minimum heat demand. Since there will not be any current heat demands, the processor will determine how many zones need to have heat start times in order to exceed the minimum demand. The processor proceeds along the "yes" path to step 236 and determines the earliest heat start time $t_{hi}$ that will produce the first percent future heating demand that is greater than the minimum heat demand. Assuming that the current time does not exceed determined heat start time of step 238, then the processor will set advance start equal to zero in step 244 before returning to step 120. System demand will hence remain equal to zero Since system demand equals none, the processor will proceed through step 122 along the yes path to steps 140, 142, 144 and, hence, to step 136 where the delay will be implemented before returning to step 102. Assuming current heating demands remain at zero, the processor will return to the advance start routine of step 120. Steps 230 to 242 will be again implemented as previously described. Referring to step 242, at some point, the current time of the system clock will be greater than or equal to the determined heat start time, $t_h$. When this occurs, the processor will proceed to step 248 and set "system demand" equal to heat. The processor will proceed to set "advance start" equal to one in step 250 before proceeding to exit step 246 and return to step 120.

The processor will proceed from step 120 to step 122 and inquire as to whether system demand is equal to none. Since system demand will be equal to heat out of the advance start routine of step 120, the processor will proceed along the no path to step 124 and inquire whether system demand equals system mode. Since system mode will normally be equal to none at this time, the processor will proceed along the no path to step 126 and activate the pump 48 before issuing a command to start the boiler in step 128. The processor will set system mode equal to heat in step 130 before sending the system mode setting to the controllers as has been previously described. The advance start signal will also be sent to the zone controllers. Each zone controller will hence receive the advance start setting of one. This will prompt each local controller to inquire as to whether the next future setpoint is greater than the zone temperature. If the answer is yes, then the local zone controller will position its control valve as though heating is presently being required.

The processor will proceed from step 134 to step 136 wherein a predefined time delay will be implemented before returning to step 102. As has been previously discussed, the logic of FIGS. 2A and 2B will again be implemented with the advance start routine of FIGS. 5A and 5B dictating the continued heating of the zones in advance of occupancy due to the provision of heated water from the boiler beginning at starting time $t_h$. The provision of heated water will continue to occur as long as the number of zones having future start times continues to produce a percent future heating demand that exceeds the minimum heat demand. It is to be appreciated that at some point the percent future heating demand may no longer exceed minimum heat demand during the execution of the advance start routine out of step 120, If this occurs, the advance start will be set equal to zero in step 252 of the routine. Since the processor will have previously set system demand equal to none in step 108 before executing the advance start routine, it will proceed to step 122 and hence to step 140. This will prompt the shutdown of the boiler 12 in step 142 if the minimum run time has been exceeded in step 140.

It is also to be appreciated that if any zone were to at some time produce a current heat demand, then the advance start routine will no longer be implemented out of step 120. It will instead be implemented through step 116 as long as the percent current heating requirement does not exceed minimum heat demand in step 108. In other words, the advance start may have been initiated out of step 120, but continue out of step 116.

Finally, it is to be appreciated that the logic of FIGS. 2A and 2B will at some point rely mostly on current heat demands as the building becomes occupied. When this occurs, the advance start routine of step 116 will only be encountered when current heating demands fail to exceed minimum heating demand. The operation of the advance start routine under these circumstances has been previously discussed.

It is to be appreciated that the control logic of FIGS. 2A and 2B allow the system controller 44 to potentially initiate heating or disable heating in response to the polling of the zone controllers 24, 30, and 34. This will actually occur only when certain requirements are met. Specifically, the boiler must have been running for a minimum time before the processor will de-activate the boiler 12. Secondly, the percent heating requirement must exceed the minimum heat requirement. It is only after this occurs that the system controller will authorize the activation of the pump 48 as well as the starting of the boiler 12.

Figure 6:
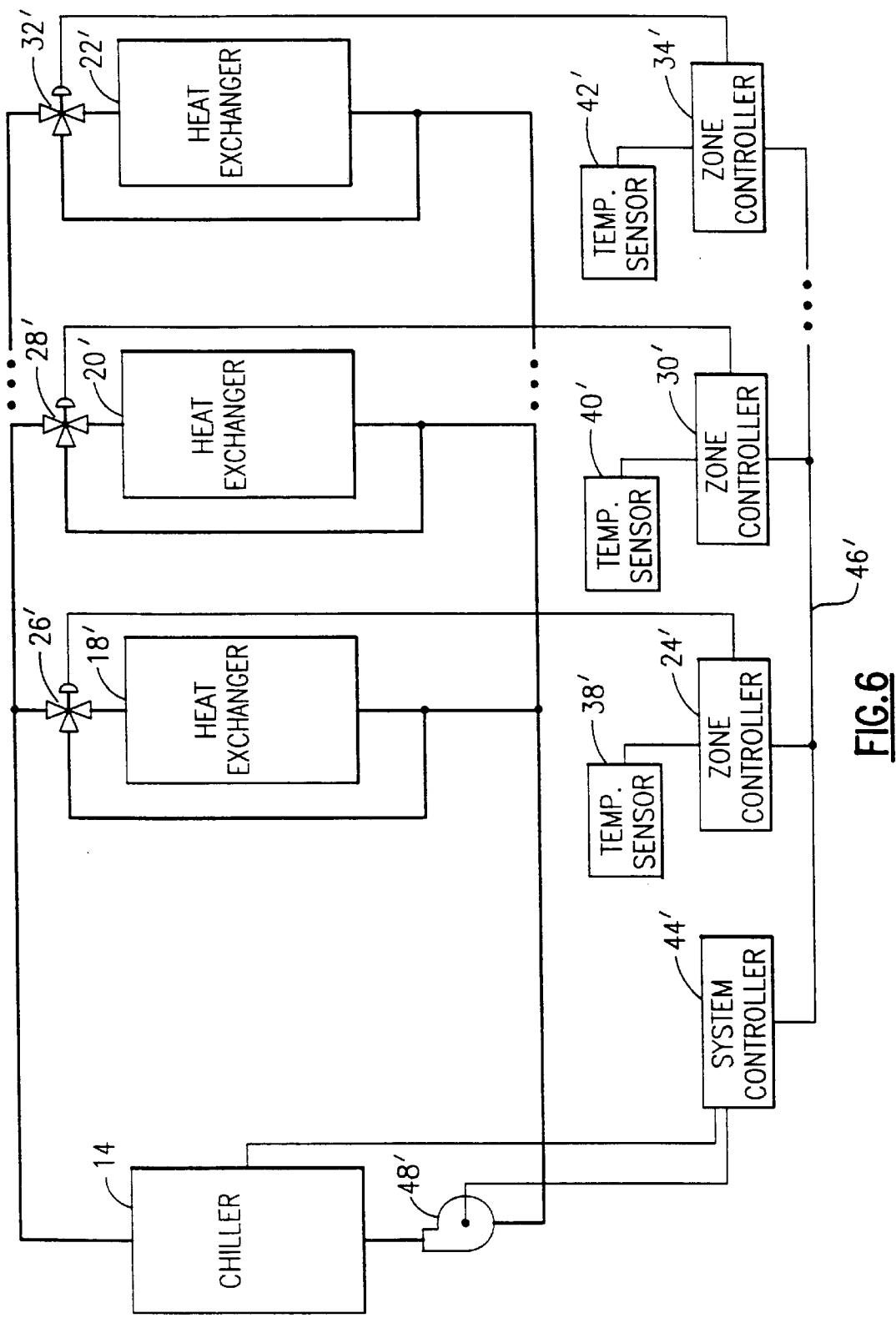
FIG. 6 is a schematic view of a system for delivering chilled water to a series of heat exchangers having zone controllers associated therewith.
Figure 7A:
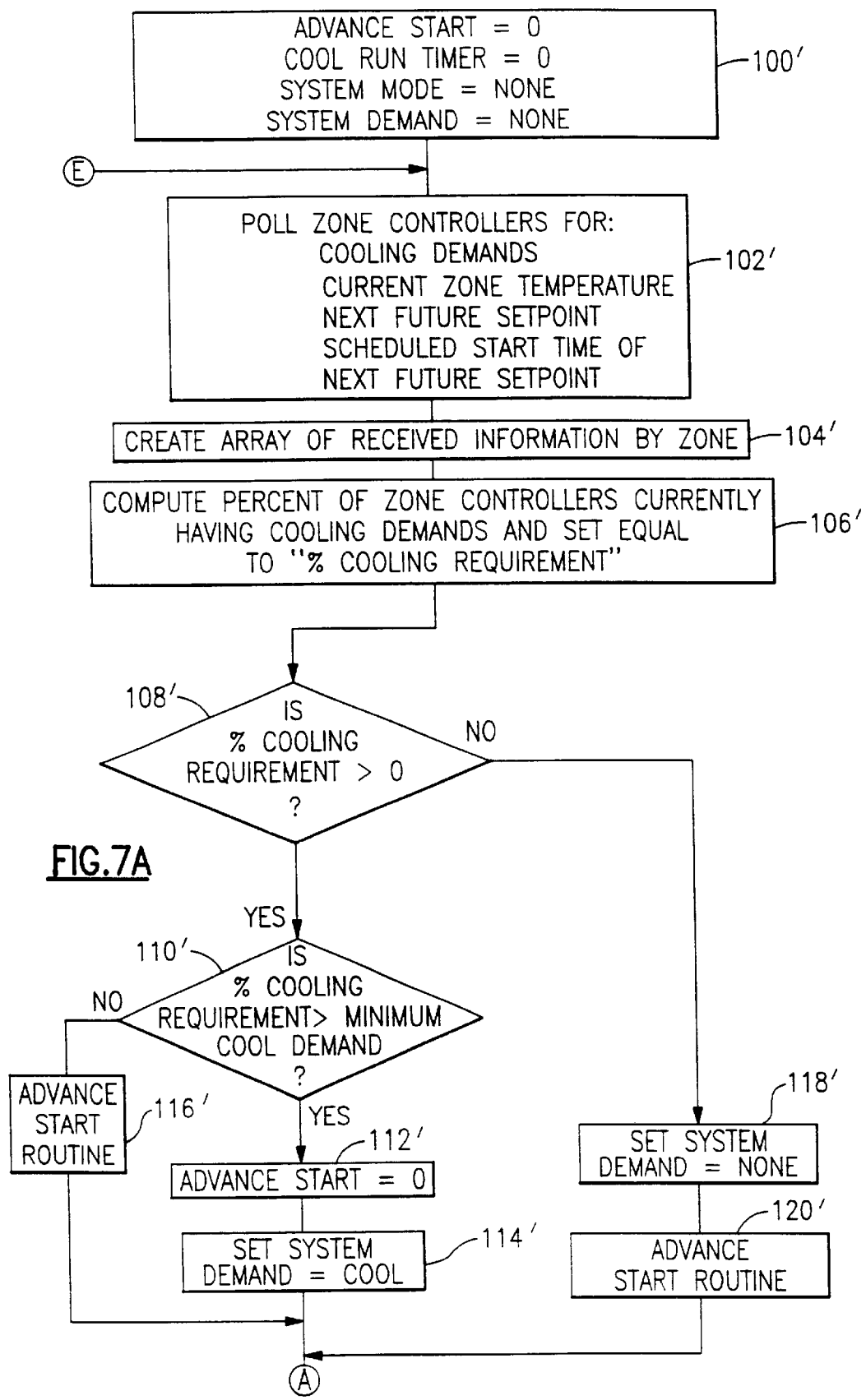
FIGS. 7A–7B are a flow chart of the method used by a system controller in communication with the zone controllers within FIG. 6 to control the activation or deactivation of a chiller within the system of FIG. 6.
Figure 7B:
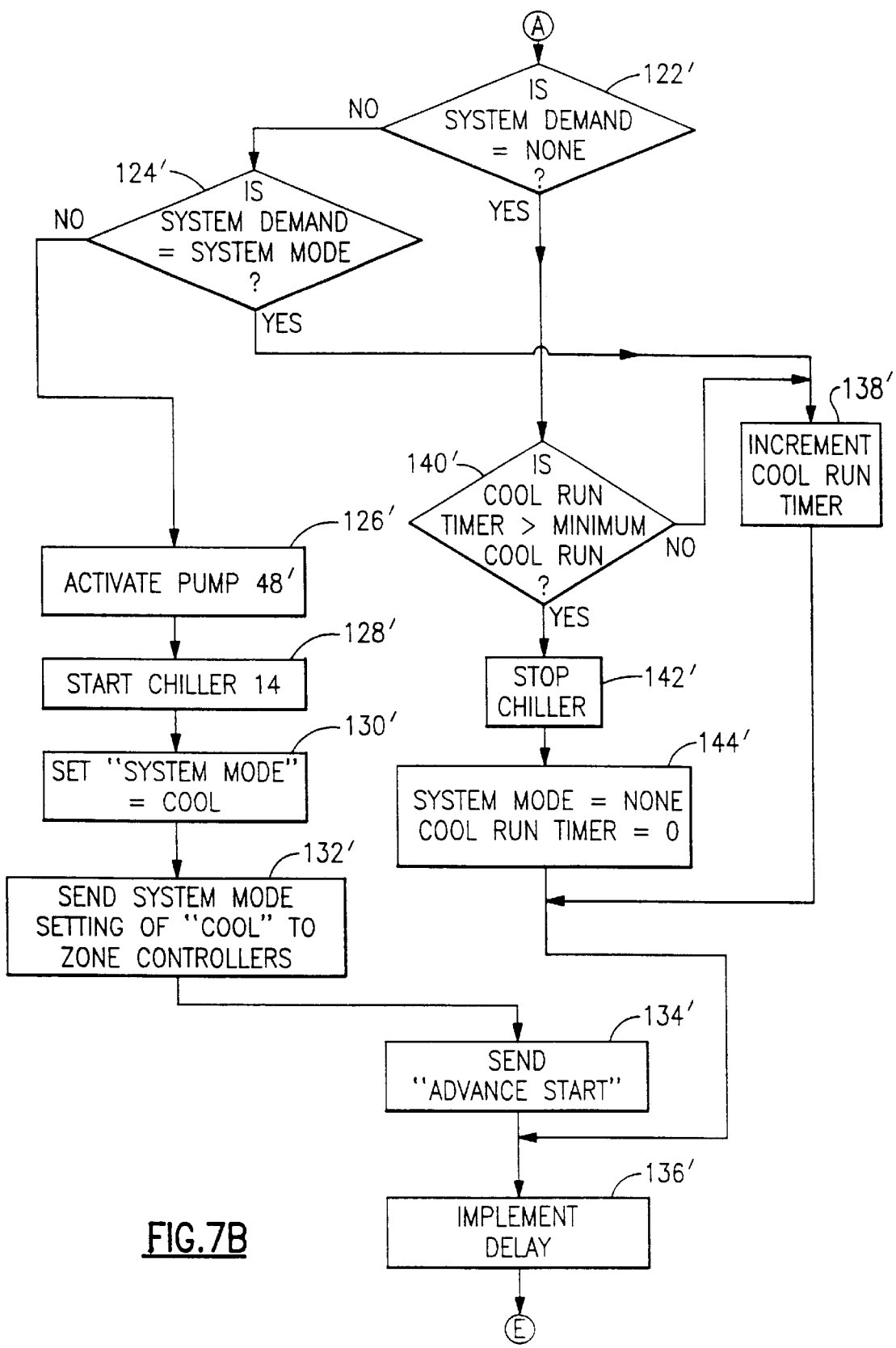
Figure 9:
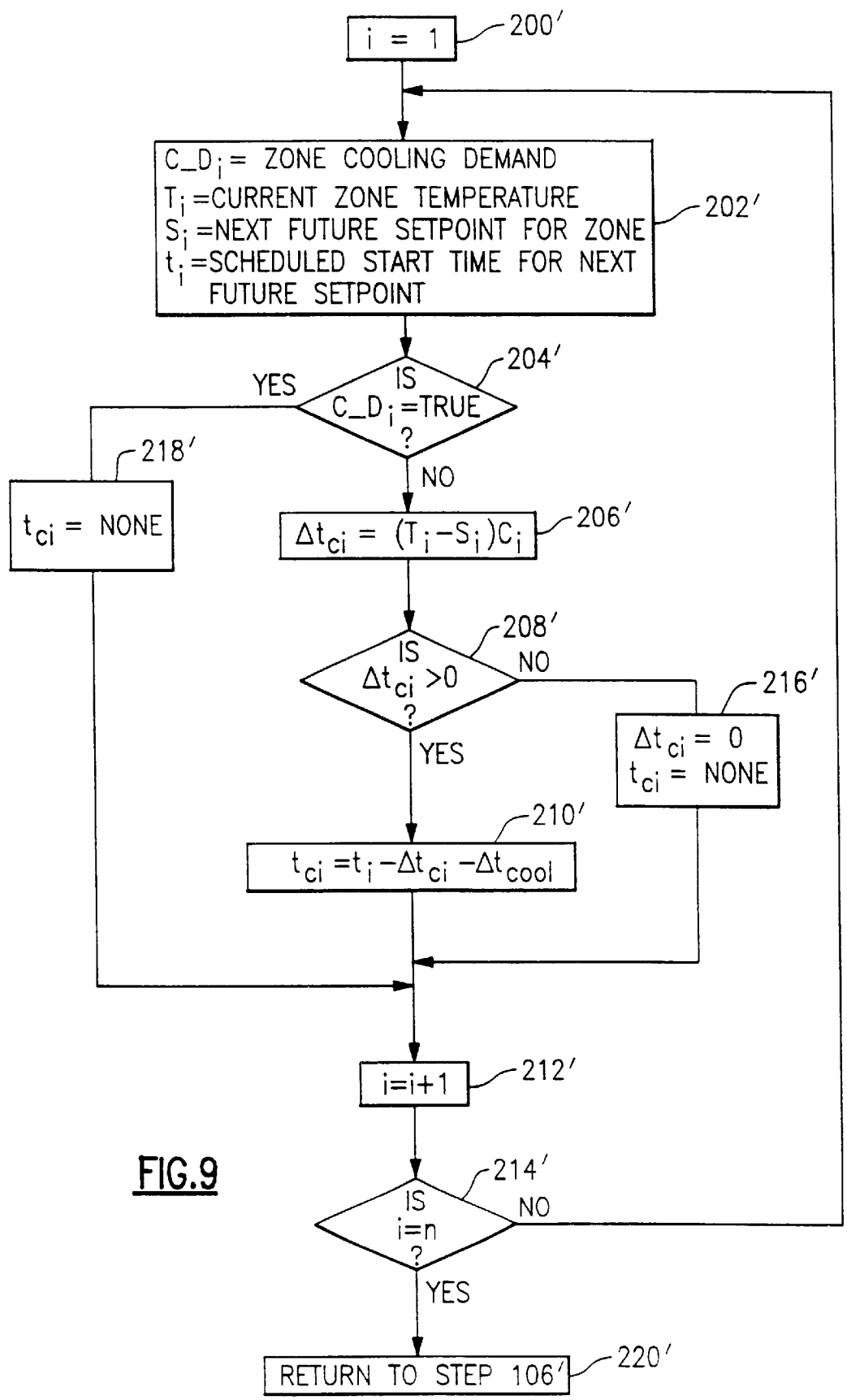
FIG. 9 is a flow chart of a routine used to produce the array of information of FIG. 8.
Figure 10A:
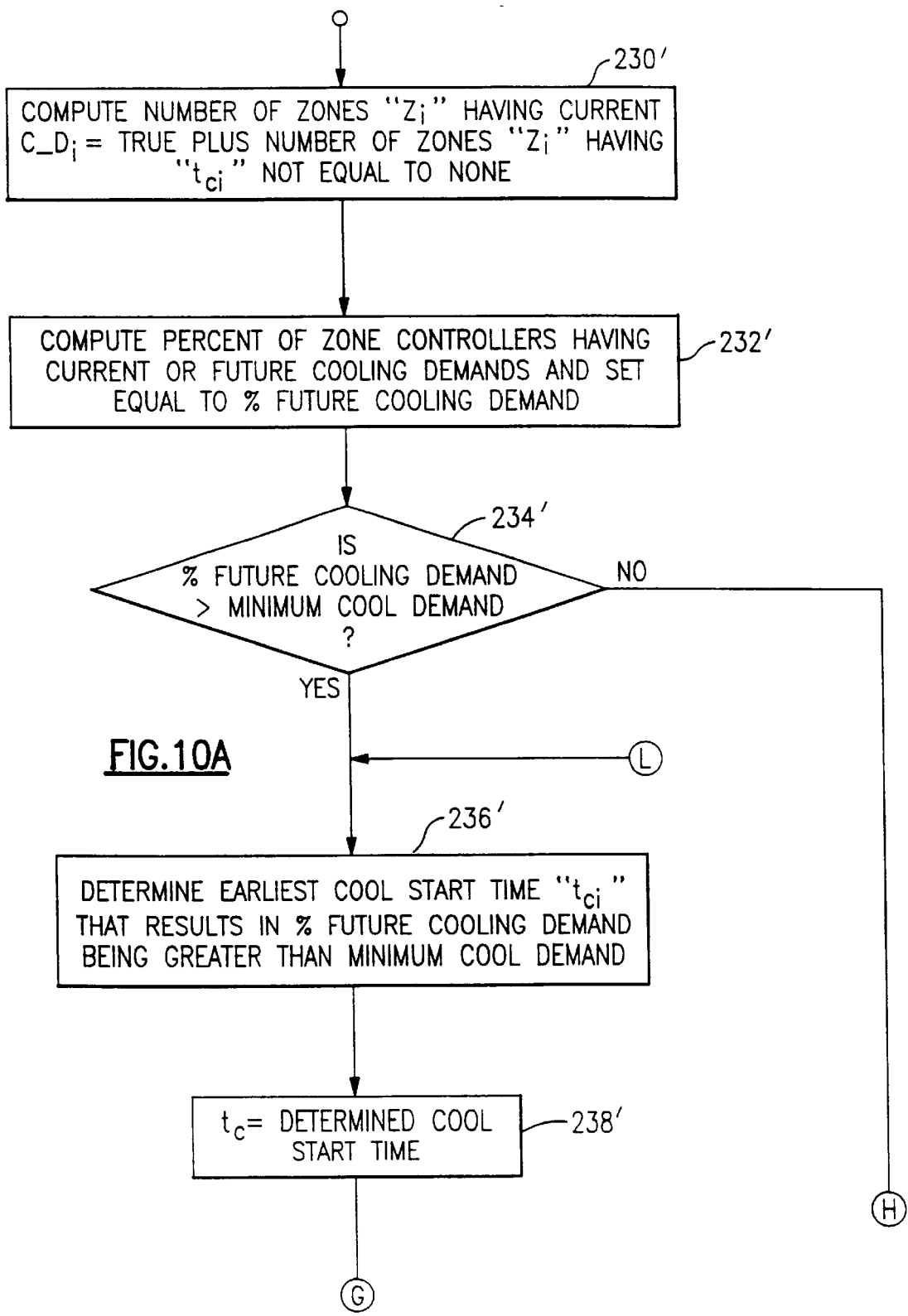
FIGS. 10A–10B are a flow chart of an advance start routine used within the flow chart of FIGS. 7A–7B.
Figure 10B:
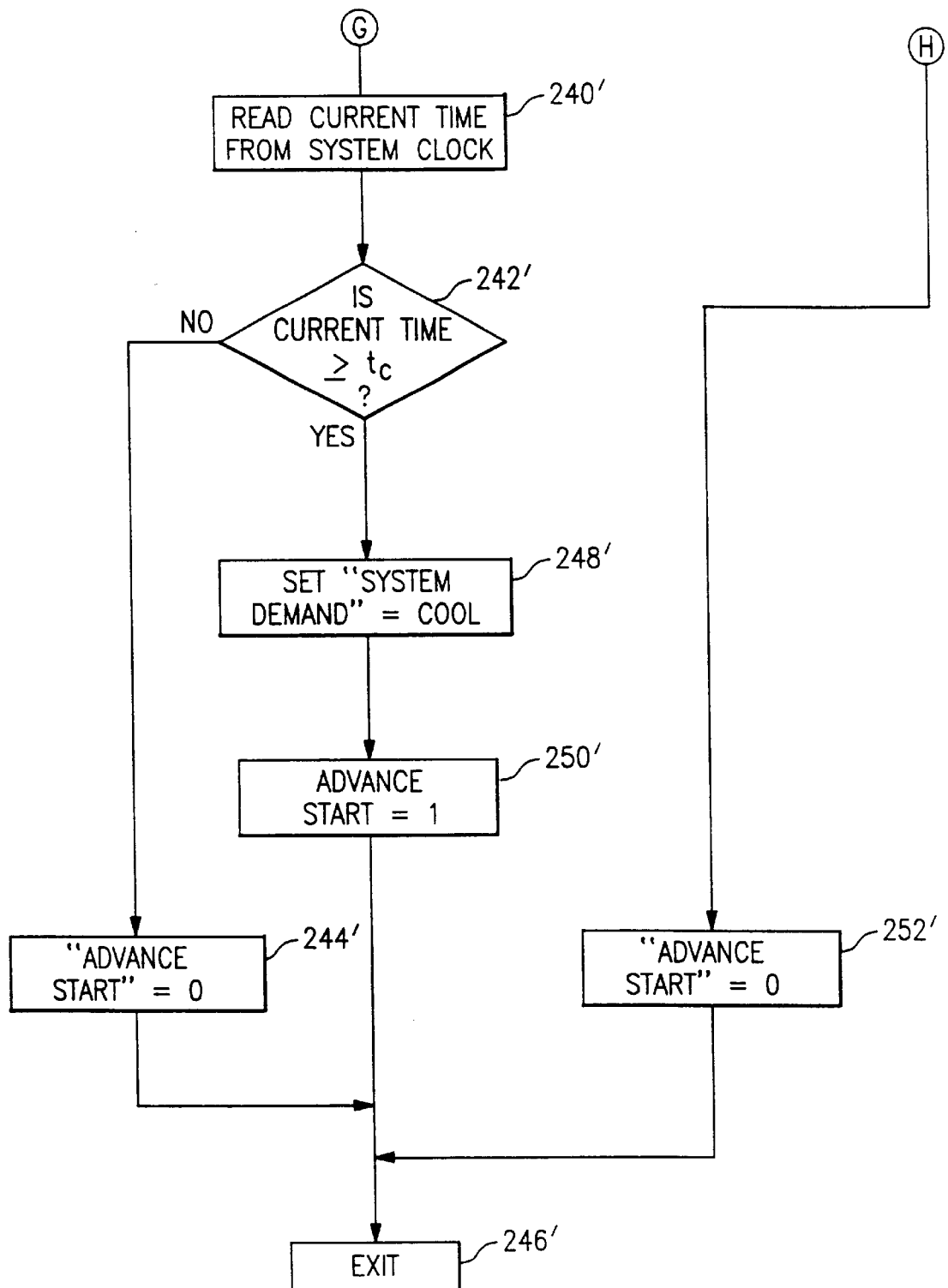

It is to be appreciated that the aforementioned logic for controlling a heating system can be similarly employed for controlling a cooling system such as illustrated in FIG. 6 wherein a chiller 14 replaces the boiler 12. All other elements of FIG. 6 are labeled with prime numbers to indicate correspondence with similarly labeled elements in FIG. 1. The logic implemented by the system controller is similarly labeled in FIG. 7 with prime numbers. This logic would be polling the zone controllers 24, 30 and 34 for cooling demands and computing percentage cooling requirements instead of percentage heating requirements. The array of FIG. 8 will reflect cooling information and the array routine of FIG. 9 will generate the $\Delta t_{ci}$ and the $t_{ci}$ in this array. The advance start routine of FIGS. 10A and 10B comprises logic labeled with prime numbers indicating similar steps to those of FIGS. 5A and 5B. This logic will process the cooling information in the array of FIG. 8 and appropriately initiate a system demand for cooling possibly in advance of occupancy as has been previously discussed with respect to heating.

It is to be appreciated that a preferred embodiment of the invention has been disclosed. Alterations or modifications may occur to one of ordinary skill in the art. For instance, the control logic may be altered so as to require a minimum amount of time to elapse before the boiler 10 can be restarted. In this case, an off timer would be used to keep track of the duration of time the system mode was set to None and would then only allow the operation of the boiler after the minimum time period was exceeded. It is also to be appreciated that the heating demands $H\_D_1$ or the cooling demands $C\_D_1$ may be computed within the system controller based upon receiving information as to present temperature and setpoint from each zone controller.

It will be appreciated by those skilled in the art that further changes could be made to the above-described invention without departing from the scope of the invention. Accordingly, the foregoing description is by way of example only and the invention is to be limited only by the following claims and equivalents thereto.

Although

What is claimed is:

1. A process for controlling the provision of conditioned water to a plurality of heat exchangers, under the control of zone controllers, said process comprising the steps of:

periodically polling the plurality of zone controllers for the heat exchangers to obtain information concerning current and future demands for conditioned water by the zone controllers;

determining whether there is a sufficient level of current demands for conditioned water from said zone controllers;

determining whether there is a sufficient level of current and future demands for conditioned water from said zone controllers when there is not a sufficient level of current demands for conditioned water; and providing conditioned water to the heat exchangers in response to a determination that there is a sufficient level of current demands for conditioned water or if there is a sufficient predominance of current and future demands for conditioned water from said zone controllers.

2. The process of claim 1 further comprising the step of:

storing in a system controller the information obtained from the zone controllers; and computing, within the system controller, a future demand for conditioned water for any zone controller not having a current demand for conditioned water.

3. The process of claim 2 wherein said step of computing a future demand for conditioned water comprises the step of:

computing a start time for providing conditioned water to any zone controller not having a current demand for conditioned water.

4. The process of claim 3 wherein the information obtained from each zone controller includes the next future setpoint and associated start time for the next future setpoint for the zone controller, a currently sensed temperature for the zone associated with the zone controller, and a factor for the respective zone controller defining the amount of time necessary to adjust the sensed temperature in the respective zone by one degree; and wherein any start time for a zone controller is computed as a function of the difference between the next future setpoint for the zone controller and the current temperature for the zone controller, the difference being multiplied by the factor for the zone controller.

5. The process of claim 3 wherein said step of determining whether there is a sufficient level of current and future demands for conditioned water from said zone controllers comprises the steps of:

adding the number of current demands for conditioned water in the array of information to the number of start times in the array; and comparing the added number of current demands for conditioned water and future start times with a minimum level of required demands for conditioned water.

6. The process of claim 5 further comprising the steps of:

determining a start time for providing conditioned water to any heat exchanger associated with a zone controller having a current or future demand for conditioned water when there is a sufficient predominance of current and future demands.

7. The process of claim 6 wherein said step of determining a start time for providing conditioned water to any heat exchanger associated with a zone controller having a current or future demand for conditioned water comprises the steps of:

determining the number of current demands for conditioned water in the stored information;

determining the number of computed start times that need to be counted and combined with the number of current demands for conditioned water in the stored information in order to exceed a minimum number of zone controllers necessary to provide conditioned water;

successively selecting the next to occur start time until the number of start times that needed to be counted have been counted; and selecting the last successively selected next to occur start time as the start time for providing conditioned water.

8. The process of claim 1 wherein the conditioned water is heated water and wherein the current and future demands for conditioned water are demands for heat.

9. The process of claim 1 wherein the conditioned water is chilled water and wherein the current and future demands for conditioned water are demands for cooling.

* * * * *